US007238880B2

(12) United States Patent
Schöffner

(10) Patent No.: US 7,238,880 B2
(45) Date of Patent: Jul. 3, 2007

(54) CONNECTING ELEMENT FOR A MECHANICALLY AND ELECTRICALLY CONDUCTIVE CONNECTION

(76) Inventor: Günther Schöffner, Frühlingstr. 17, Gaimersheim (DE) 85080

( * ) Notice: Subject to any disclaimer, the term of this patent is extended or adjusted under 35 U.S.C. 154(b) by 0 days.

(21) Appl. No.: 10/517,629

(22) PCT Filed: Apr. 29, 2003

(86) PCT No.: PCT/DE03/01388

§ 371 (c)(1), (2), (4) Date: Dec. 13, 2004

(87) PCT Pub. No.: WO03/107485

PCT Pub. Date: Dec. 24, 2003

(65) Prior Publication Data

US 2005/0266717 A1 Dec. 1, 2005

(30) Foreign Application Priority Data

Jun. 13, 2002 (DE) ................................ 102 27 405

(51) Int. Cl.
*H02G 15/08* (2006.01)

(52) U.S. Cl. .................................................. 174/21 JS

(58) Field of Classification Search .................. 174/28, 174/21 JS
See application file for complete search history.

(56) References Cited

U.S. PATENT DOCUMENTS 2,589,328 A 3/1952 Bondon

FOREIGN PATENT DOCUMENTS

| | | | |
|---|---|---|---|
| DE | 1905080 | A1 | 8/1970 |
| DE | 2250441 | B | 10/1973 |
| DE | CH 555601 | * | 10/1974 |
| DE | 2410593 | A1 | 9/1975 |
| DE | 3211845 | A1 | 10/1983 |

* cited by examiner

*Primary Examiner*—Chau N. Nguyen
(74) *Attorney, Agent, or Firm*—Morrison & Foerster LLP

(57) ABSTRACT

The invention relates to a connecting element (11, 21, 41, 51) for a mechanically and electrically conductive connection, comprising at least one expansion element (14, 15, 16, 17, 23, 24, 44, 45) which is tensed in a recess which is arranged in the outer contour of the electric conductor (12, 13). The tensing of the at least one expansion element in the recess occurs by means of control elements (18, 26, 47, 48, 56, 57).

5 Claims, 6 Drawing Sheets

CONNECTING ELEMENT FOR A MECHANICALLY AND ELECTRICALLY CONDUCTIVE CONNECTION

CLAIM FOR PRIORITY

This application is a national stage of PCT/DE03/01388, published in the German language on Dec. 24, 2003, which claims the benefit of priority to German Application No. DE 102 27 405.3, filed on Jun. 13, 2002.

TECHNICAL FIELD OF THE INVENTION

The invention relates to a connecting element for a mechanical and electrically conductive connection, and in particular, having an electrical conductor, which has a cutout in its outer contour in which at least one spreading element of the connecting element can be inserted.

BACKGROUND OF THE INVENTION

A connecting element is disclosed, for example, in U.S. Pat. No. 2,589,328. In the known arrangement, two elongate electrical conductors are coupled to one another at the ends. Owing to their design as a tube, the two conductors each have a cutout on their end faces. Spreading elements of a connecting element can be inserted in these cutouts. The connecting element essentially has a rotationally symmetrical design and is matched to the diameters of the tubular conductors. The connecting element is of hollow-cylindrical design, the inner diameter being constant over the entire length, and the outer diameter of the connecting element increasing stepwise, starting from a central section towards the two ends. The connecting element has a slit, which passes completely through the hollow cylinder wall, along its rotation axis. This slit forms in each case a spreading element at the ends of the connecting element, the spreading element being elastically deformable. The end-face spreading elements can each be plugged into the tube openings in the two electrical conductors. As they are plugged in, the spreading elements are elastically deformed and ensure a mechanical and electrically conductive connection of the two electrical conductors.

An elastic deformation of the spreading elements limits the mechanical loading of such connections. It is possible only in a very complex manner to ensure the required mechanical robustness for such connections on a permanent basis. Furthermore, such connections are only insufficiently protected against vibrations. It is thus possible for an electrical conductor to be released from one of the spreading elements owing to vibrations.

SUMMARY OF THE INVENTION

The present invention discloses a connecting element of the type mentioned initially which makes possible, with simple assembly, a mechanically and electrically reliable connection to an electrical conductor.

In one embodiment of the invention, there is a connecting element of the type mentioned initially which can actuate the at least one spreading element by means of an operating element in order to brace it in the cutout.

Targeted bracing of a spreading element by means of an operating element makes it possible to adjust the desired contact force of the spreading element against the cutout walls. The operating elements provided for bracing purposes may be, for example, threaded bolts, screws, nuts, suitable gear arrangements or other tools. By suitably selecting the operating elements, the connecting element can be repeatedly connected to an electrical conductor and released from an electrical conductor. The operating elements make it possible to produce a connection which can be subjected to a high mechanical and electrical load, depending on the loading to be expected.

Furthermore, provision may advantageously be made for it to be possible for the at least one spreading element to be braced by means of a bracing movement which is directed parallel to the direction of its insertion in the cutout. As an alternative to this, provision may furthermore be made for it to be possible for the at least one spreading element to be braced by means of a bracing movement which is directed perpendicular to the direction of its insertion in the cutout.

A bracing movement which is directed parallel or perpendicular to the insertion direction of the spreading element in the cutout makes it possible to use tools having a simple design for bringing about the bracing movement. A bracing movement is understood to mean the movement of parts which are required to bring about a bracing of the at least one spreading element.

Furthermore, provision may advantageously be made for it to be possible for the bracing of the at least one spreading element to be brought about by faces which can be moved relative to one another and are arranged in relation to one another in the form of a wedge in cross section.

Faces which can be moved relative to one another and which are in the form of a wedge in relation to one another make it possible to achieve high bracing forces given compact dimensions. Furthermore, the relative movement of two faces in the form of wedges, for example by means of threaded bolts, can be regulated very precisely. Such faces should be robust and simple to produce.

Furthermore, one advantageous emboidment provides for the faces to be conical faces. Conical faces have the advantage that they arrange a very large area on a very small physical space. Furthermore, conical faces can be mounted in a simple manner owing to their self-centering properties. Furthermore, a conical face has a favorable design as regards its dielectric influence on an electrical field.

Furthermore, one advantageous embodiment provides for the connecting element to have at least one first and at least one second spreading element, which each have an associated first and second electrical conductor.

A connecting element having such a design can be used as a coupling piece between electrical conductors. This means that it is not necessary to equip the conductors themselves with a connecting element. The electrical conductors can thus be produced in a simplified manner.

Furthermore, provision may advantageously be made for a mounting apparatus for the electrical conductor to be arranged on the connecting element.

Mounting apparatuses are provided for supporting and mounting the electrical conductor. By arranging the mounting apparatus on the connecting element, it is possible to dispense with such apparatuses on the electrical conductor itself. The electrical conductor is thus completely free of mounting apparatuses and is mounted using the spreading elements of the connecting element. Additional mechanical loads owing to mounting apparatuses arranged on the electrical conductor are thus avoided. Examples of possible mounting apparatuses are post insulators or disk insulators.

A further advantageous embodiment provides for the electrical conductor to be the inner conductor of a compressed gas-insulated tubular conductor.

Such connecting elements are suitable, in particular, for connecting the inner conductors of compressed gas-insulated tubular conductors. Such tubular conductors should be able to provide a reliable connection lasting decades between the electrical conductors arranged in its interior. Furthermore, such tubular conductors should be laid in a cost-effective manner. The connecting element proposed according to the invention ensures both cost-effective assembly and a reliable and permanent connection of the inner conductors of a compressed gas-insulated tubular conductor.

In another embodiment of the invention, there is a conductor arrangement having a connecting element having the above features and having an electrical conductor can advantageously be designed such that the electrical conductor is an elongate electrical conductor, and the cutout is arranged on one of its end faces. Furthermore, provision may advantageously be made for the electrical conductor in a conductor arrangement (as mentioned above) to be a tube.

The above-described connecting element makes it possible in a simple manner to make mechanical and electrical contact at the ends between elongate electrical conductors, in particular tubular electrical conductors. The connecting element can be of extremely compact design, with the result that it can be matched to the outer contour of the elongate electrical conductor, for example to the outer radius of a tubular electrical conductor. In particular when tubes are used, there is no need for complex working of their end faces, since the spreading elements provided for bracing purposes simply protrude into the tube openings and can be braced there.

BRIEF DESCRIPTION OF THE INVENTION

The invention will be shown schematically below in a drawing with reference to exemplary embodiments and then described in more detail.

In the drawings.

The components illustrated in the figures which have the same functions are provided with the same reference numerals.

DETAILED DESCRIPTION OF THE INVENTION

Figure 1:
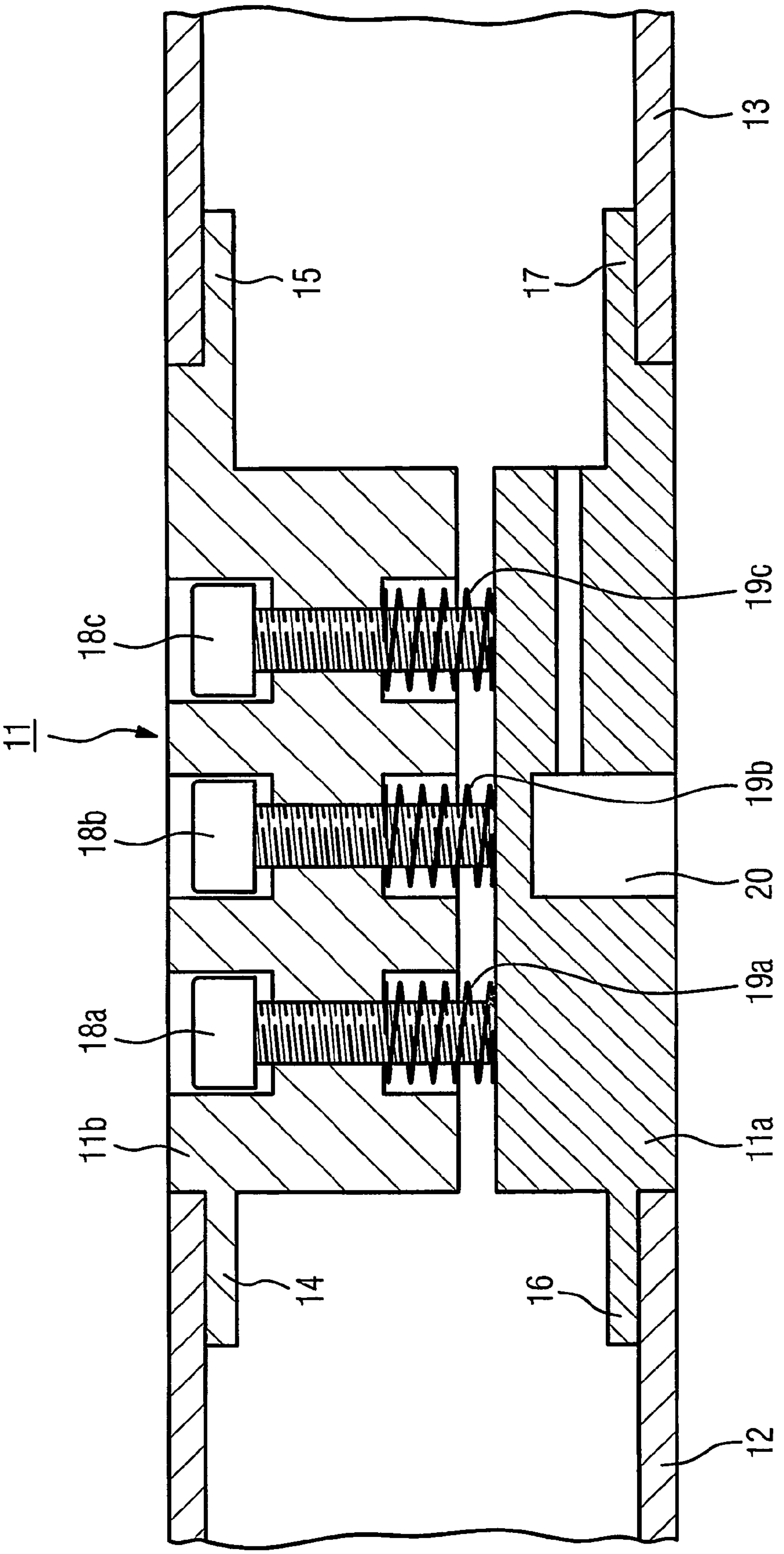
FIG. 1 shows a first embodiment of a connecting element.

FIG. 1 shows a section through a first embodiment of a connecting element 11. The first embodiment of the connecting element 11 connects a first electrical conductor 12 to a second electrical conductor 13. The first electrical conductor 12 and the second electrical conductor 13 are tubular and are arranged coaxially opposite one another. The electrical conductors 12, 13 are, for example, the electrical conductors of an electrical power transmission device, such as a gas-insulated tubular conductor, a gas-insulated switchgear assembly, an electrical cable or a busbar arrangement. The connecting element 11 of the first embodiment connects the first electrical conductor 12 and the second electrical conductor 13 at the ends. The outer contour of the connecting element 11 of the first embodiment is designed such that, when installed, the outer contour of the first electrical conductor 12 and of the second electrical conductor 13 is developed. The connecting element 11 of the first embodiment is of multipart design and has a first main part 11*a* and a second main part 11*b*. When the connecting element 11 of the first embodiment has been installed, the first main part 11*a* and the second main part 11*b* form an approximately circular outer contour in cross section. The connecting element 11 of the first embodiment has a first spreading element 14 and a second spreading element 15 on the second main part 11*b*. The first main part 11*a* has a third spreading element 16 and a fourth spreading element 17. The spreading elements 14, 15, 16 and 17 are essentially in the form of a section of a hollow cylinder and are each arranged on the end faces of the connecting element 11 of the first embodiment, to be precise such that they protrude into the tube opening in the first electrical conductor 12 or the second electrical conductor 13. Introduced into the second main part 11*b* are threaded holes in which threaded bolts 18*a, b, c* are guided. The threaded bolts 18*a, b, c* are the operating elements, by means of which the spreading elements 14, 15, 16 and 17 can be braced into the cutouts (tube openings) in the electrical conductors 12, 13. The threaded bolts 18*a, b, c* are supported on the first main part 11*a* of the connecting element 11. Owing to a rotary movement of the threaded bolts 18*a, b, c*, the second main part 11*b* can be displaced with respect to the first main part 11*a*, to be precise such that the relative movement between the first and the second main part 11*a*, 11*b* takes place perpendicular to the direction in which the spreading elements 14, 15, 16 and 17 were inserted in the cutouts in the electrical conductors 12, 13. A plurality of spring elements 19*a, b, c* are arranged between the first main part 11*a* and the second main part 11*b*. The spring elements 19*a, b, c* make it easier to manipulate the connecting element 11 of the first embodiment during assembly, by spacing the second main part 11*b* apart from the first main part 11*a* when the load on the threaded bolts 18*a, b, c* is relieved. In the first main part 11*a* of the connecting element 11 of the first embodiment is arranged a receptacle 20 in which a post insulator can be fixed (cf. FIG. 4).

Figure 2:
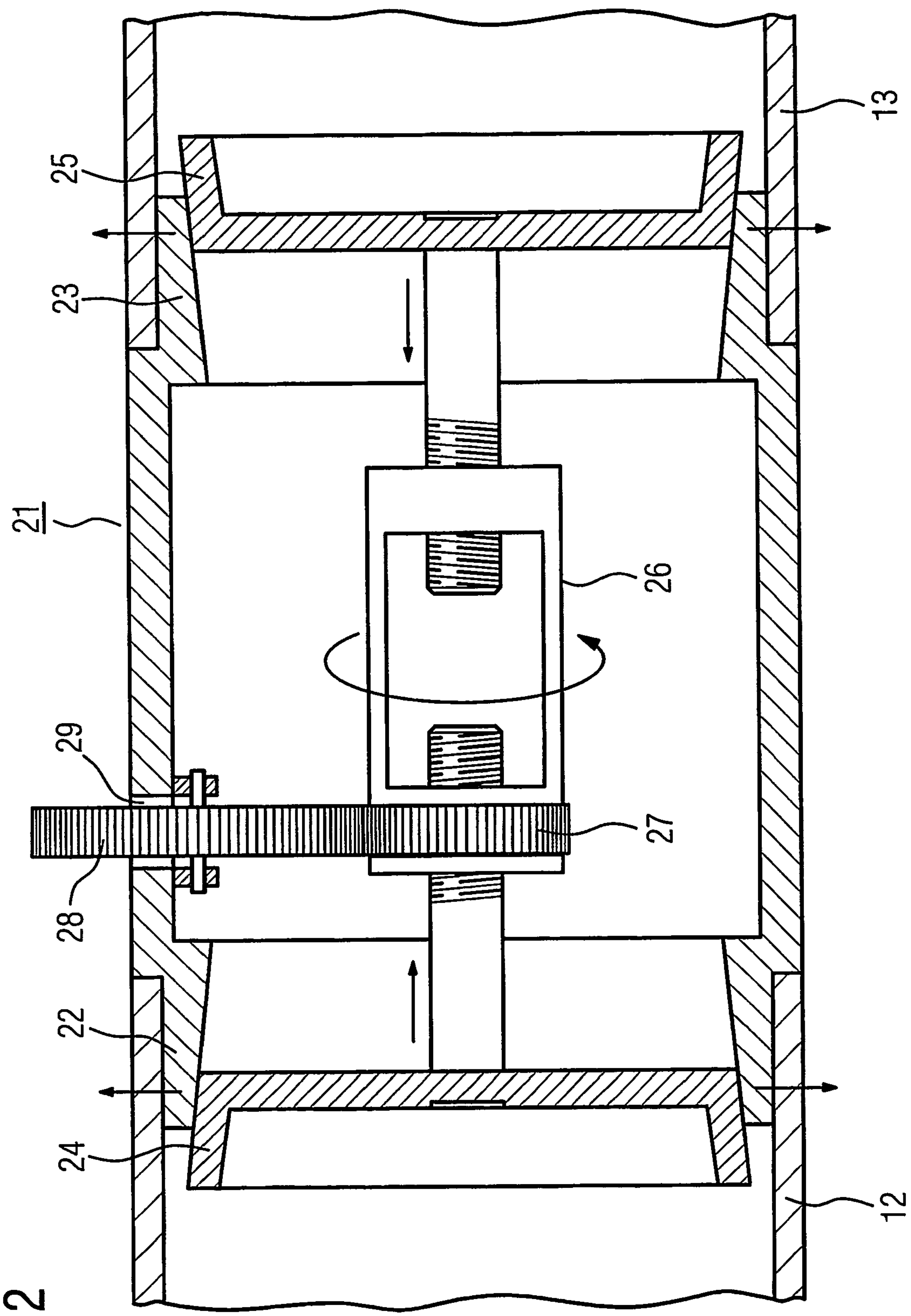
FIG. 2 shows a second embodiment of a connecting element.

FIG. 2 shows a section through a second embodiment of a connecting element 21. The connecting element 21 of the second embodiment connects an electrical conductor 12 to a second electrical conductor 13. The connecting element 21 of the second embodiment is of hollow-cylindrical design and is provided at its free ends with a fifth spreading element 22 and a sixth spreading element 23. The fifth and sixth spreading elements 22, 23 have a cylindrical outer contour. The diameters of the outer contour of the fifth spreading element 22 and the sixth spreading element 23 approximately correspond to the diameters of the tube openings in the first electrical conductor 12 and the second electrical conductor 13. In the central section of the connecting element 21 of the second embodiment, the essentially cylindrical connecting element 21 of the second embodiment has approximately the same diameter as the first electrical conductor 12 and the second electrical conductor 13. The inner diameter of the hollow-cylindrical fifth and sixth spreading elements 22, 23 is designed such that it is conically tapered towards the central section of the connecting element 21. A conical first truncated cone 24 is inserted in the conically tapering opening in the fifth spreading element 22. A conical second truncated cone 25 is inserted in the conical opening in the sixth spreading element 23. The first truncated cone 24 and the second truncated cone 25 each have a concentrically arranged threaded bolt, which are screwed into a common tumbuckle 26. Owing to a rotary movement of the tumbuckle 26, both the first truncated cone 24 and the second truncated cone 25 can be moved into the respective conical opening in the fifth spreading element 22 and the sixth spreading element 23 in the direction of the central section of the connecting element 21. The bracing movement of the truncated cones 24, 25 which is required for bracing the fifth spreading element 22 and the sixth spreading element 23 is directed parallel to the direction of insertion of the fifth and sixth spreading element 22, 23 in the cutout in the electrical conductors 12, 13. In order to produce the rotary movement of the turnbuckle 26, a toothed rim 27 is arranged on the turnbuckle 26. A toothed wheel 28 can be placed on the toothed rim 27, said toothed wheel 28 engaging through an opening 29 through the wall of the connecting element 21 of the second embodiment. Outside the connecting element 21 of the second embodiment, the toothed wheel 28 can be driven and, as a result, the turnbuckle 26 can be moved. In the process, the design for the mounting of the toothed wheel 28 can be selected such that it is mounted for the duration of the assembly of the connecting element 21 of the second embodiment or is mounted permanently. Owing to the movement of the truncated cones 24, 25 into the conical openings in the fifth and the sixth spreading element 22, 23, the spreading elements are pressed or braced against the inner walls of the tubular electrical conductors 12, 13. Owing to this bracing, the first electrical conductor 12 makes electrically conductive contact with the second electrical conductor 13 via the connecting element 21 and a mechanically rigid and strain-resistant connection is formed.

Figure 3:
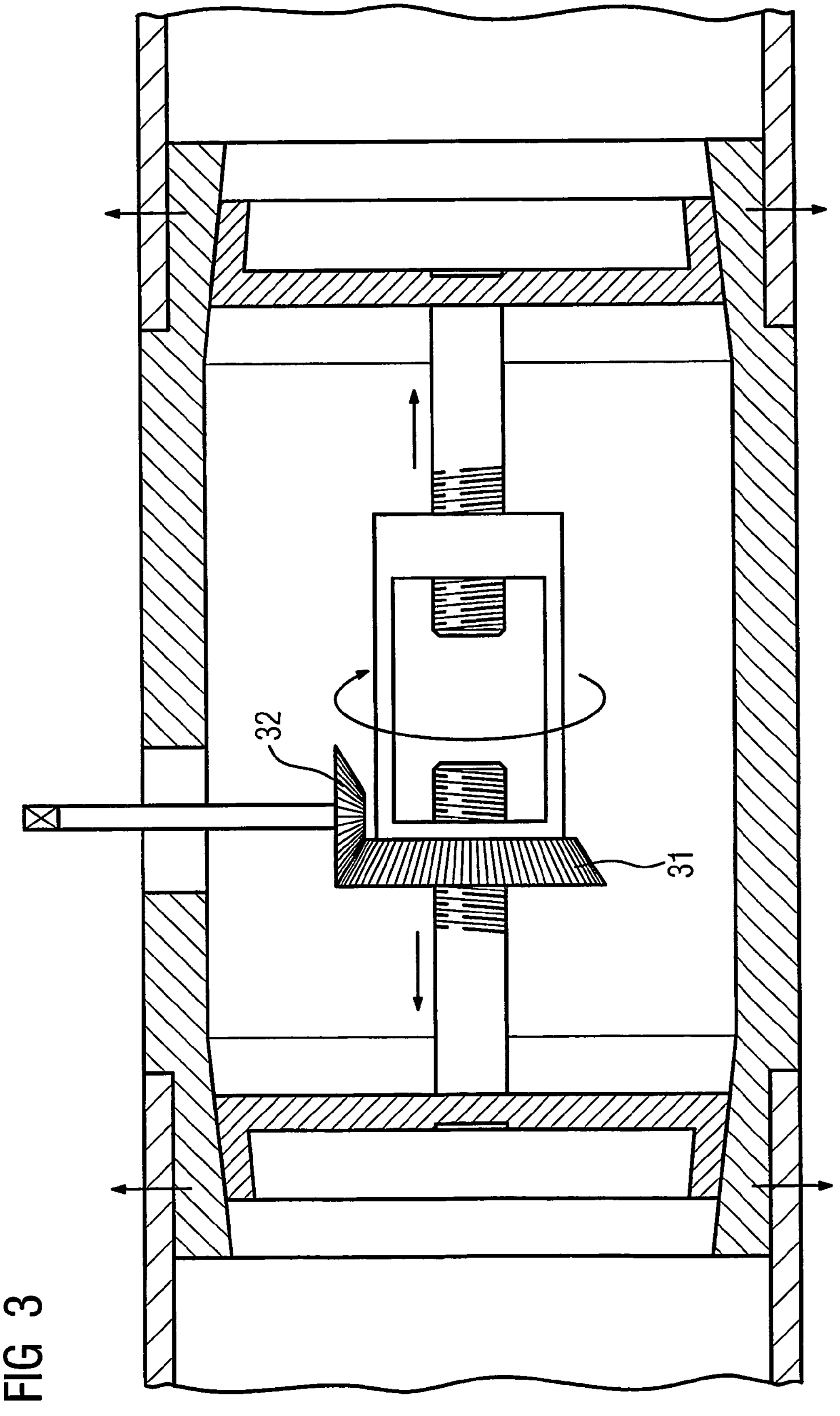
FIG. 3 shows a third embodiment of a connecting element.

The third embodiment shown in FIG. 3 shows a modification of the second embodiment shown in FIG. 2 of a connecting element. The third embodiment differs from the second embodiment by the fact that the coning angle in the spreading elements and the coning angle of the truncated cones have opposing directional senses, with the result that, for bracing the connecting elements, the truncated cones are displaced from the central region of the connecting element of the third embodiment in the direction of the free ends of the spreading elements. In order to drive the turnbuckle in the third embodiment, the turnbuckle is provided with a conical toothed rim 31. A conical gearwheel 32 can be plugged onto this conical toothed rim, it being possible for said conical gearwheel 32 to be driven. The conical gearwheel can be permanently associated with the connecting element or can also be inserted in the interior of the connecting element of the third embodiment for assembly purposes.

Figure 4:
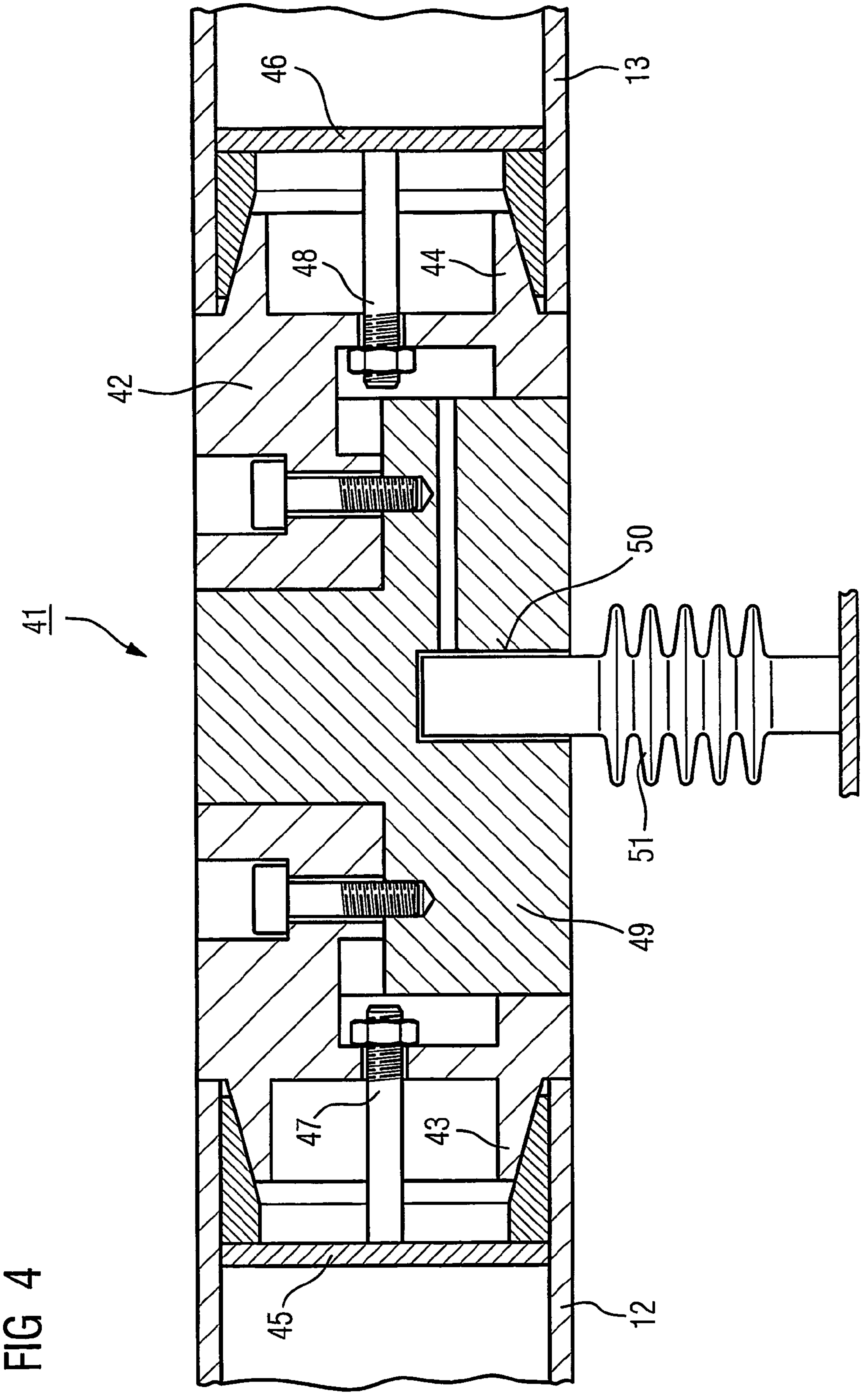
FIG. 4 shows a fourth embodiment of a connecting element.

The fourth embodiment illustrated in FIG. 4 of a connecting element 41 has a base body 42. The base body 42 has a first outer cone 43 and a second outer cone 44 at its ends. The two outer cones 43, 44 each act as a spreading element and protrude into the end-side cutouts in the first electrical conductor 12 and the second electrical conductor 13. A first bracing cylinder 45 is placed on the first outer cone 43, and a second bracing cylinder 46 is placed on the second outer cone 44. The bracing cylinders 45, 46 have a slightly smaller outer diameter than the cutouts in the first electrical conductor 12 and the second electrical conductor 13. The first bracing cylinder 45 and the second bracing cylinder 46 can each be moved towards one of the two outer cones 43 and 44 by means of threaded bolts 47, 48. Owing to the conical design of the faces, coming into contact with the outer cones 43 and 44, of the first bracing cylinder 45 and the second bracing cylinder 46, the peripheral surfaces of the bracing cylinders 45, 46 are pressed against the inner tube wall of the electrical conductors 12, 13. The base body 42 has a cutout, in order to make it possible to brace the threaded bolts 47 and 48. The cutout in the base body 42 can be closed by means of a closure element 49. Once the closure element 49 has been inserted, the outer contour of the connecting element 41 has an essentially cylindrical sheath. A cutout 50 is introduced into the closure element 49. It is possible for, for example, a post insulator 51 to be plugged into the cutout 50 in the closure element 49, said post insulator 51 also supporting the electrical conductors.

Figure 5:
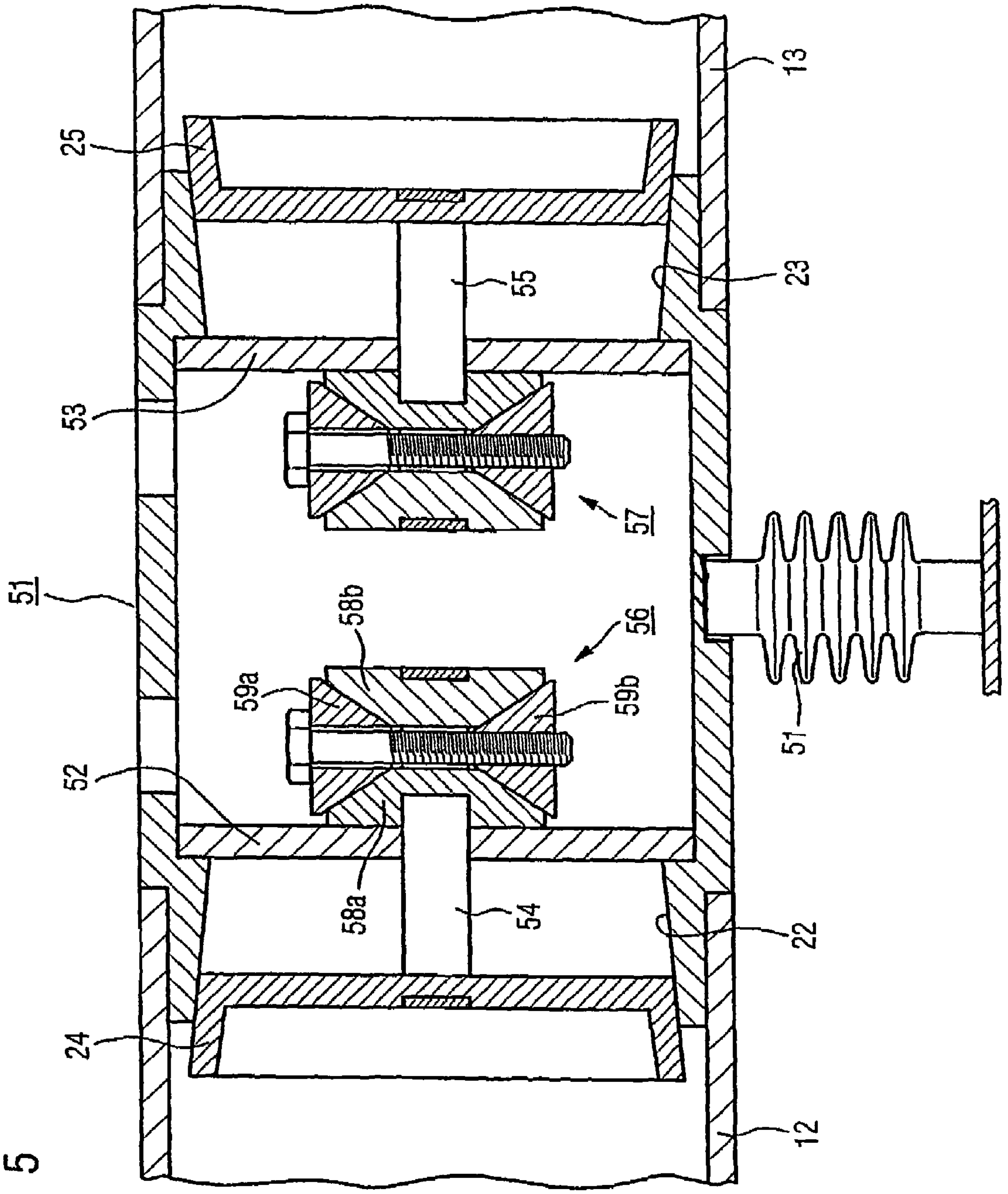
FIG. 5 shows a fifth embodiment of a connecting element.

FIG. 5 shows the section through a fifth embodiment of a connecting element 51. In terms of operation, the connecting element 51 of the fifth embodiment corresponds to the connecting element 21 of the second embodiment. In the fifth embodiment, only the type of bracing for the truncated cones 24 and 25 has an alternative design. A first supporting wall 52 and a second supporting wall 53 are arranged in the central region of the connecting element 51 of the fifth embodiment. The first truncated cone 24 is supported against the first supporting wall 52, and the second truncated cone 25 is supported against the second supporting wall 53. A first tensioning loop 54 is passed through the first truncated cone 24 and the first supporting wall 52. A second tensioning loop 55 is passed through the second truncated cone 25 and the second supporting wall 53. A tensioning element 56 is introduced on the side of the first supporting wall 52 which faces away from the first truncated cone 24. An identical tensioning element 57 is introduced into the tensioning loop 55 on the side of the second supporting wall 53 which faces away from the second truncated cone 25. The way in which the tensioning elements 56, 57 operate will be described in more detail with reference to the tensioning element 56 associated with the first truncated cone 24. The tensioning element 56 has two plates 58*a, b*, which are directed towards one another such that two conically tapering faces are arranged on respectively opposite sides, with the result that two conically tapering openings are formed, whose cone openings are directed opposite to one another. Two wedges 59*a, b* are inserted in the conical openings and can be displaced with respect to one another by means of a screw 60, to be precise such that the wedge faces drive the conical faces of the plates 58*a, b* away from one another. This results in the first tensioning loop 54 being tensioned, and the first truncated cone 24 being drawn into the conical opening in the fifth spreading element 22. The bracing movement, which is required for bracing the fifth spreading element 22, of the first truncated cone 24 is in this case directed parallel to the insertion direction of the fifth spreading element 22 in the cutout in the first electrical conductor 12.

Figure 6:
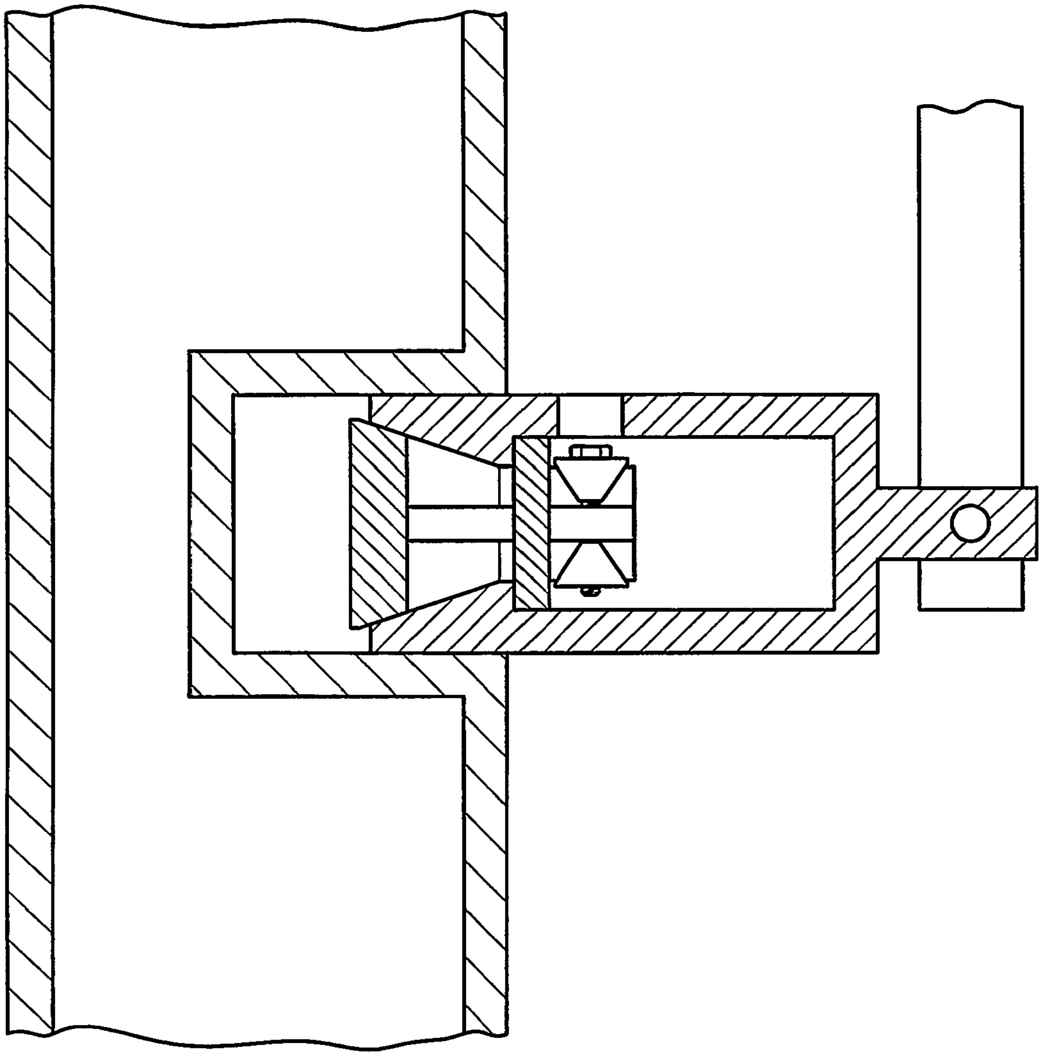
FIG. 6 shows a sixth embodiment of a connecting element.

In addition to the linear connection of two electrical conductors illustrated in the figures, the connecting element is also suitable for connecting conductors meeting one another at an angle. Provision may also be made for only subsections of the connecting element to be used (see FIG. 6).

Further embodiments can be designed such that the various features, in particular drive apparatuses, support points, alignment of the conical faces with respect to one another etc., of the embodiments illustrated in FIGS. 1 to 6 are combined with one another.

The hollow-cylindrical sections of the different embodiments of the connecting elements may be of multipart design, for example may comprise two, three or more half-shells, in order to make simple assembly possible.

What is claimed is:

1. A connecting element for a mechanical and electrically conductive connection, comprising:

an operating element having first and second plates which are directed toward one another such that two conically tapering faces are arranged on respective opposite sides of the first and second plates, thereby forming two conically tapering openings with cone openings directed opposite to one another;

first and second wedges respectively inserted in the two cone openings, wherein the first and second wedges can be displaced with respect to each other such that faces of the wedges drive the conical tapering faces of the first and second plates away from one another;

a supporting wall, with at least one of the first and second plates supported against the supporting wall by a tensioning loop; and the tensioning loop passing through the supporting wall, wherein when the first and second wedges are displaced with respect to each other driving the conical tapering faces of the first and second plates away from one another, the tensioning loop is tensioned.

2. The connecting element of claim 1, wherein the first and second wedges are displaced with respect to each other by a screw.

3. The connecting element of claim 1, wherein the connecting element has at least one first and at least one second spreading element, which each have an associated first and second electrical conductor.

4. A connecting element for a mechanical and electrically conductive connection, comprising:

an electrical conductor, which has a cutout in its outer contour in which at least one spreading element of the connecting element can be inserted;

an operating element having first and second plates which are directed toward one another such that two conically tapering faces are arranged on respective opposite sides of the first and second plates, thereby forming two conically tapering openings with cone openings directed opposite to one another;

first and second wedges respectively inserted in the two cone openings, wherein the first and second wedges can be displaced with respect to each other such that faces of the wedges drive the conical tapering faces of the first and second plates away from one another;

a supporting wall arranged in a central region of the connecting element;

a truncated cone supported against the supporting wall; and a tensioning loop passing through the truncated cone and the supporting wall, wherein when the first and second wedges are displaced with respect to each other driving the conical tapering faces of the first and second plates away from one another, the tensioning loop is tensioned and the truncated cone is drawn into a conical opening in the at least on spreading element.

5. The connecting element of claim 4, wherein the electrical conductor is an inner conductor of a compressed gas-insulated tubular conductor.

* * * * *